(12) United States Patent
Biggi et al.

(10) Patent No.: US 6,490,861 B2
(45) Date of Patent: Dec. 10, 2002

(54) HYDRAULIC STEERING SYSTEM

(75) Inventors: Massimo Biggi, Carrara (IT); Angelo Gregorio, Modena (IT); Enrico Sedoni, Modena (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/813,559

(22) Filed: Mar. 21, 2001

(65) Prior Publication Data

US 2001/0032461 A1 Oct. 25, 2001

(30) Foreign Application Priority Data

Apr. 4, 2000 (IT) .................................. BO2000A000188

(51) Int. Cl.[7] .............................................. F16D 31/02
(52) U.S. Cl. ............................... 60/384; 60/385; 60/387
(58) Field of Search ........................... 60/384, 385, 387, 60/388, 392

(56) References Cited

U.S. PATENT DOCUMENTS 4,003,202 A * 1/1977 Becker .......................... 60/385
4,942,935 A * 7/1990 Lech ............................. 60/384

* cited by examiner

Primary Examiner—Edward K. Look
Assistant Examiner—Michael Leslie
(74) Attorney, Agent, or Firm—Larry W. Miller; John William Stader

(57) ABSTRACT

A hydraulic steering system for a tractor is provided which can be operated in a conventional steering mode or in a fast steering mode. In conventional steering mode, a conventional steering wheel and steering motor direct pressurized oil to the steerable wheels for selecting the turning direction, the turning angle, and the speed with which the turning angle is achieved. In fast steering mode, a fast-turning valve is controlled by the operator to direct oil directly to the steerable wheels, thereby by-passing the steering motor. The conventional steering wheel and steering motor continue however to control the steering operation.

16 Claims, 5 Drawing Sheets

HYDRAULIC STEERING SYSTEM

BACKGROUND OF THE INVENTION

The present invention relates to a hydraulic steering system for vehicles utilizing hydraulic steering motors and, more particularly, to a steering system that can be used on agricultural machines, such as tractors, earthmoving machines, or any loading and unloading machine in general.

As is known, steering action consists in selecting the turning direction (right or left), the turning angle (how many degrees each wheel is to be turned with respect to an initial vertical wheel plane), and the speed with which the turning angle is achieved, all of which may be performed by the operator using, for example, a steering wheel connected to a hydraulic steering motor.

In certain operating conditions of the machines referred to above, the operator is forced to turn the steering wheel rapidly to turn the vehicle as quickly as possible.

It should be pointed out that, in this context, the term "conventional mode" is intended to mean any wheel steering action performed using a steering wheel, a hydraulic steering motor, and a hydraulic steering actuating device, and is normally performed by the operator during normal use of the vehicle, and in particular at fairly high vehicle travelling speeds.

"Fast mode", on the other hand, is intended to mean a steering mode in which the hydraulic steering motor is in some way bypassed and pressurized oil is fed directly to the steering actuating device. This second mode is designed to reduce the effort required of the operator, especially when maneuvering the vehicle in the farm yard, when making tight U-turns at the end of a field, or in loading applications. In all these situations, "conventional mode" would call for strenuous, continuous and fast operation of the steering wheel.

In certain recent solutions, to permit easier handling of the steering system, "joysticks" have been provided, which are separate from the steering wheel and are activated by the operator when there is a need to switch from "conventional" to "fast mode" steering. Joystick devices, however, disconnect the steering wheel completely from the "fast mode" device.

It would be desirable to provide a steering mechanism that can be utilized with hydraulic steering motors and provide a fast mode of operation.

SUMMARY OF THE INVENTION

It is an object of the present invention to provide a steering device for rapidly activating the steering cylinders, but still using a steering wheel as a steering control device in terms of direction, angle and speed.

It is another object of the present invention to provide a fast steering system where the fast mode of operation can only be implemented at low vehicle travelling speeds.

It is still another object of the present invention to provide a fast mode control device located on the vehicle steering wheel itself.

It is an advantage of this invention that the steering can be controlled at all times from the steering wheel, even when in a fast mode of operation.

It is another advantage of this invention that the system can be configured so that the fast mode of operation can be implemented only by first pushing a fast mode button and then turning the steering wheel.

It is a feature of this invention that the release of the push button for implementing the fast mode of operation will restore the normal mode of operation of the steering system.

It is still another advantage of this invention that the release of the push button for implementing the fast mode of operation will immediately restore the normal mode of operation of the steering system.

In is another feature of this invention that a failure of the hydraulic pump allows for an emergency steering mode of operation.

It is still another feature of this invention that a spring 41 of the change valve 40 and the depressurization of the drive conduit 79 upon failure of the hydraulic pump ensure that the manual emergency steering mode of operation can be restored to the steering system.

It is yet another feature of this invention that the fast mode of operation can only be implemented only at low vehicle speed under the control of an electronic control unit.

It is yet a further feature of this invention that the fast mode of operation can be engaged by activating a button located on the steering wheel, or at any point in the cab within easy reach of the operator.

It is yet another advantage of this invention that the fast mode of operation can be selectively and conveniently engaged.

According to the present invention, there is provided a hydraulic steering system having a fast steering mode the in which the same steering mechanism is operable to select the turning direction, the turning angle, and the speed with which said turning angle is reached.

These and other objects, features and advantages are accomplished according to the instant invention by providing a hydraulic steering system for a tractor which can be operated in a conventional steering mode or in a fast steering mode. In the conventional steering mode of operation, a conventional steering wheel and steering motor direct pressurized oil to the steerable wheels for selecting the turning direction, the turning angle, and the speed with which the turning angle is achieved. In the fast steering mode of operation, a fast-turning valve is controlled by the operator to direct oil directly to the steerable wheels, thereby by-passing the steering motor. The conventional steering wheel and steering motor continue, however, to control the steering operation as in the conventional steering mode of operation.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
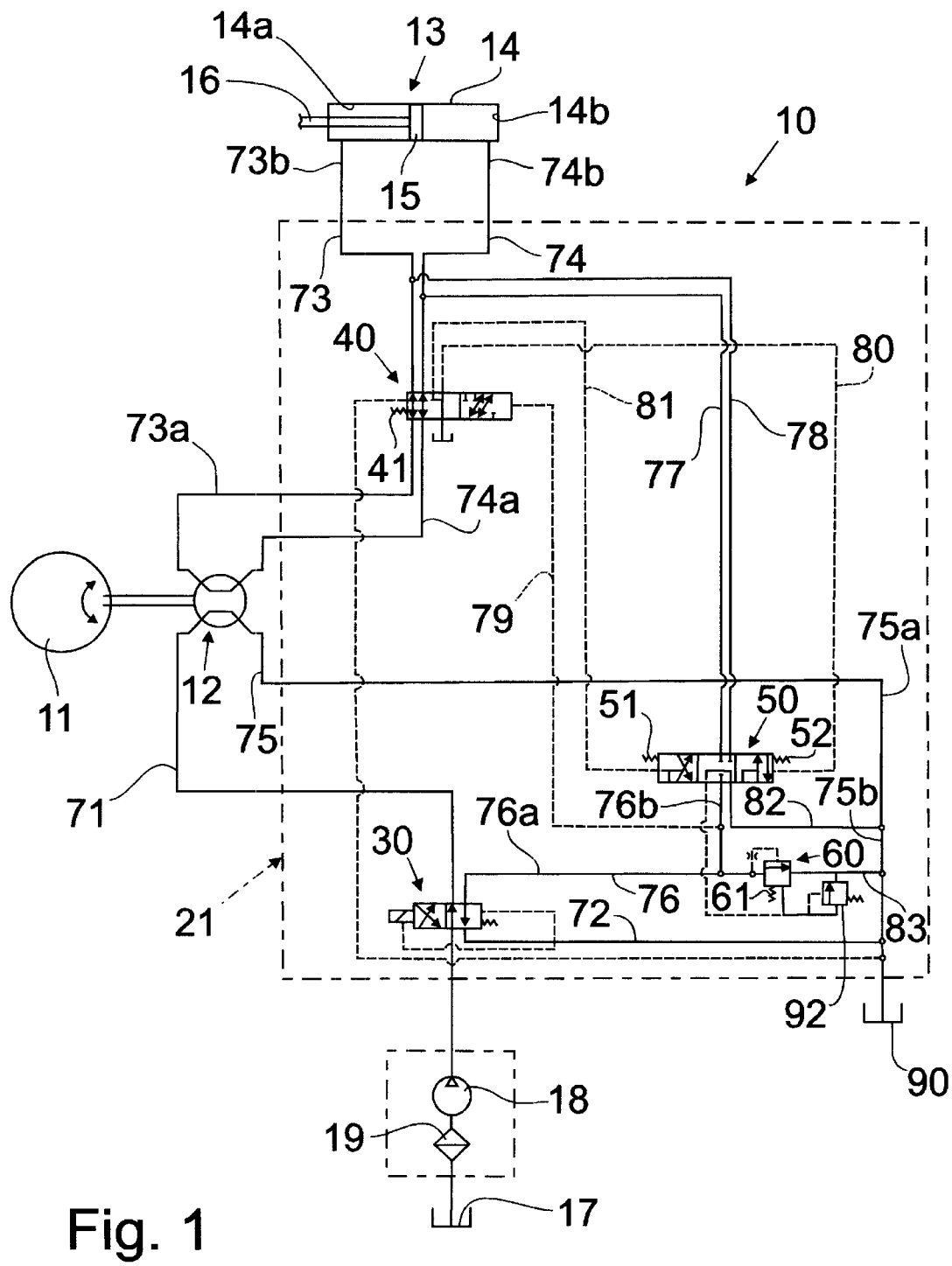
FIG. 1 is a schematic drawing of a hydraulic circuit for a first embodiment of a hydraulic steering system incorporating the principles of the instant invention, including an open-center hydraulic steering motor in which steering is performed using a conventional steering wheel, the system being shown in the conventional mode configuration.

Referring first to FIG. 1, a hydraulic circuit forming a hydraulic steering system can best be seen. The hydraulic steering system 10, according to a first embodiment of the present invention, can utilize an open-center hydraulic steering motor. System 10 would also include a steering wheel 11, which, when turned one way or the other by an operator (not shown), turns two wheels of a conventional vehicle (not shown) in a manner described in greater detail below.

The steering wheel 11 is connected by known manner to an open-center conventional hydraulic steering motor 12, which in every respect may be considered a rotary selecting device for feeding a pressurized fluid, preferably oil, to an actuating device 13 for turning the wheels of the vehicle. The actuating device 13 can be a conventional hydraulic cylinder 14 divided into two chambers 14a, 14b by a piston 15 having a rod 16. By feeding pressurized oil into chamber 14a or 14b, as described in detail later on, the rod 16 is withdrawn or extended to turn the two wheels in one direction or the other in a conventional manner.

Conventional steering action consists in selecting a turning direction (right or left), a turning angle (how many degrees each wheel is to be turned with respect to an initial vertical wheel plane), and the speed with which the turning angle is reached.

The oil for activating the various devices comes from a tank or reservoir 17, is fed through a filter 19 along an intake conduit 20 (referenced only in FIG. 5), and is pumped by a pump 18 to a hydraulic circuit 21 and to actuating device 13. Apart from open-center hydraulic steering motor 12, the hydraulic circuit 21 will also include a split valve 30, a change valve 40, a distributor 50, a pressure compensator 60, and a number of pressurized oil supply conduits described in greater detail below in conjunction with the operation of hydraulic system 10.

Pressurized oil is fed into circuit 21 along a delivery conduit 71 for supplying hydraulic steering motor 12. Oil flow along the delivery conduit 71 is controlled by the valve 30, which is a conventional 4/2 hydraulic valve, i.e. a four-way, two-position-type valve. In the configuration depicted in FIG. 1, the system 10 provides for conventional turning mode of operation.

In the conventional mode of operation depicted in FIG. 1, the split valve 30 permits pressurized oil to feed to open-center hydraulic steering motor 12 along conduit 71. Change valve 40, which is preferably a hydraulic 7/2, i.e. seven-way, two position-type of valve, permits pressurized oil flow to actuating device 13 along a conduit 73 or a conduit 74, as controlled by open-center hydraulic steering motor 12.

The change valve 40 divides conduit 73 into two portions 73a, 73b, and conduit 74 into two portions 74a, 74b. Consequently, by turning steering wheel 11 and appropriately positioning a corresponding open-center hydraulic steering motor 12, the operator supplies pressurized oil either to chamber 14a of cylinder 14 along conduit 73, or to chamber 14b along conduit 74. Obviously, when chamber 14a is supplied with pressurized oil, the rod 16 is withdrawn inside cylinder 14, whereas, when oil is fed into chamber 14b, the rod 16 is extended outwardly, so as to turn the two wheels as required, i.e. either left or right turn direction.

It should be pointed out that, besides directing oil flow to conduit 73 or 74, as described above, hydraulic steering motor 12 also provides, in emergency manual steering conditions, such as would be needed in the event of a failure of the hydraulic pump 18, for pumping the oil mechanically, this pumping action being performed by the operator turning the steering wheel 11.

When oil is fed into chamber 14a, the oil in chamber 14b is fed back along conduit 74, through the change valve 40, which is still in the position shown in FIG. 1, through the hydraulic steering motor 12, and along a drain conduit 75 into the reservoir 90, which could possibly be the same as tank 17. Drain conduit 75 may be thought of as comprising two portions 75a, 75b.

While the hydraulic steering system 10 is operable in the above-described conventional mode of operation, i.e. the mode in which the actuating device 13 is activated directly by the operator using steering wheel 11 and the hydraulic steering motor 12, and in which steering action is determined directly by the operator turning steering wheel 11 to select the turning direction (right or left), the turning angle (how many degrees each wheel is to be turned with respect to an initial vertical wheel plane), and the speed with which the turning angle is reached, the steering system is also operable in a fast mode of operation, which will be described in greater detail below.

Figure 2:
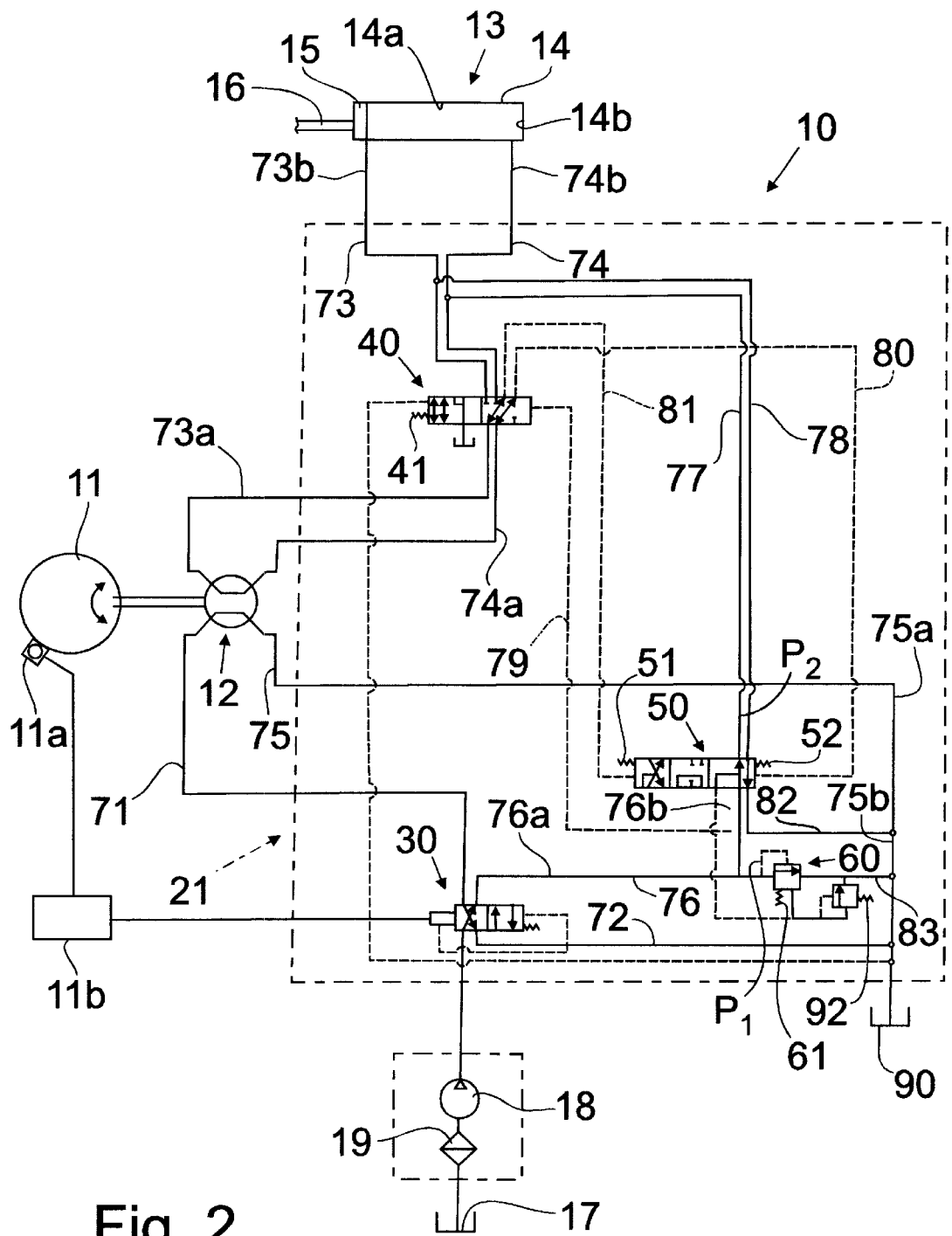
FIG. 2 is a schematic drawing of a hydraulic circuit similar to that of FIG. 1, but with fast-turn mechanism engaged by the operator to perform a fast turn mode of operation in a first direction.
Figure 3:
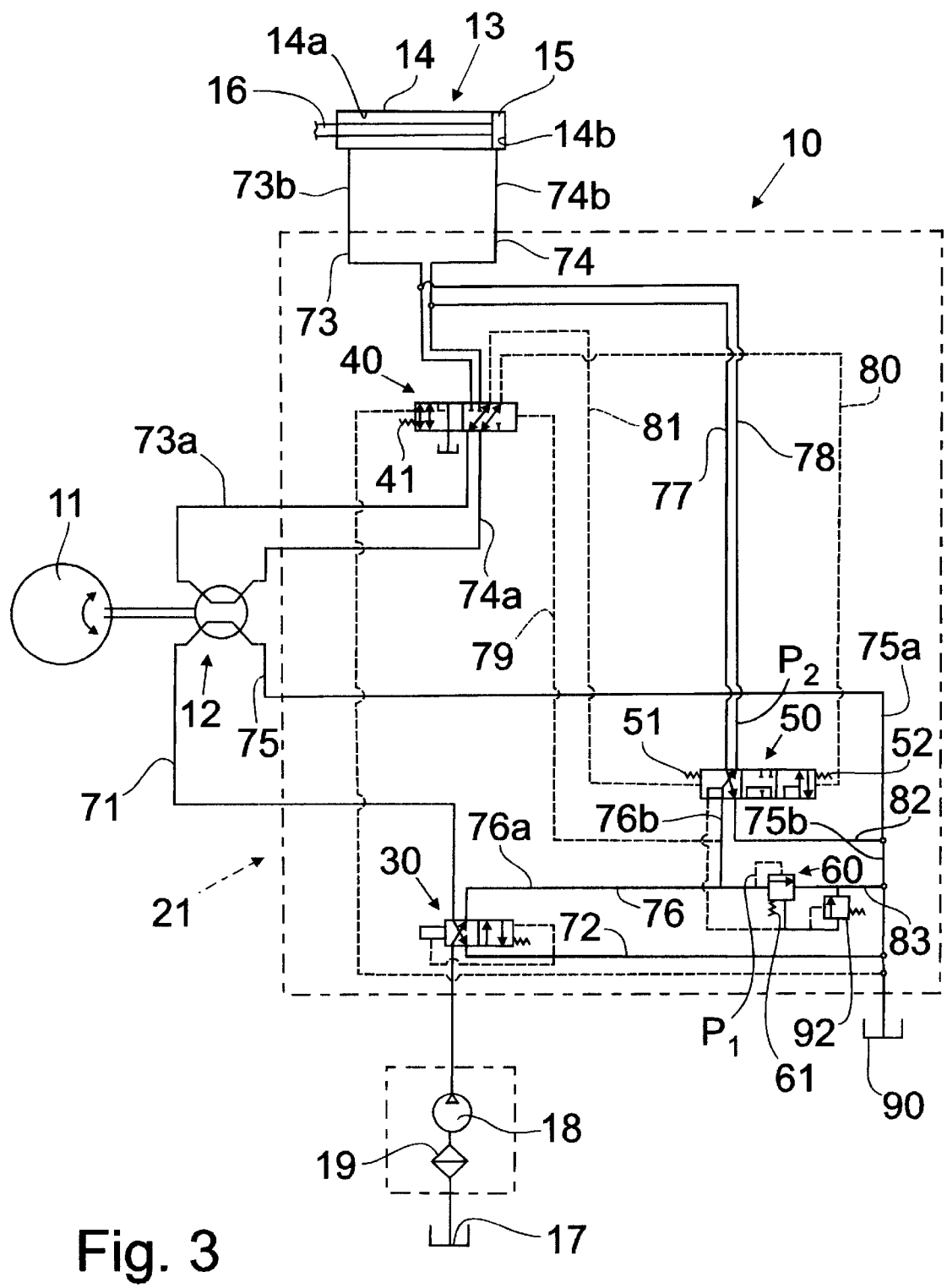
FIG. 3 is a schematic drawing of a hydraulic circuit similar to that of FIG. 2, but with the fast-turn mechanism engaged by the operator to perform a fast turn mode of operation in a second direction opposite to the first direction shown in FIG. 2.

Referring now to FIGS. 2 and 3, the fast mode of operation can best be seen. More specifically, when the valve 30 is switched by the operator to the position shown in FIG. 2, the pressurized oil, as opposed to flowing along conduit 71 as described above, flows along a conduit 76, having a first portion 76a and a second portion 76b, and is directed toward the distributor 50, which is preferably a hydraulic 5/3, i.e. a five-way, three-position, valve. In the configuration shown in FIG. 1, the distributor 50 is shown in the closed position, which cuts off pressurized oil flow from the distributor 50 to the actuating device 13 along a conduit 77 or a conduit 78 for respectively supplying chamber 14b or chamber 14a. Since portion 76b of conduit 76 nevertheless remains under pressure, the pressure of the oil in this portion 76b can be used to push the change valve 40, in opposition to a spring 41, into the position depicted in FIG. 2. This movement of the change valve 40 is done using a pilot conduit 79, which, disregarding the load losses inherent to conduit 79, transmits the pressure of the oil in portion 76b of conduit 76 to the change valve 40 in order to move the spool in opposition to spring 41.

As shown in FIGS. 1 and 2, two pilot conduits 80, 81 extend from the change valve 40 to determine the position of distributor 50 as will be described in greater detail below.

When the change valve 40 is switched from the position depicted in FIG. 1 to the position depicted in FIG. 2 by the switching valve 30, as described above, the pilot conduit 80 is connected hydraulically to portion 74a of conduit 74, and the pilot conduit 81 is simultaneously connected hydraulically to portion 73a of conduit 73.

Therefore, by acting on hydraulic steering motor 12 by means of steering wheel 11, it is possible to unbalance selectively the hydraulic circuit comprising conduits 74a, 80, 73a, 81, and to force the distributor 50 into the position shown in FIG. 2 or 3, in both cases overcoming the action of respective springs 51, 52 located on opposite sides of the distributor 50.

In other words, once change valve 40 is switched to the FIG. 2 or 3 position by the pressurized oil in drive conduit 79, the operator, using hydraulic steering motor 12, can mechanically pump oil into pilot conduit 81 (FIG. 2) or into pilot conduit 80 (FIG. 3) by turning steering wheel 11 one way or the other. Obviously, the spool of distributor 50 is shifted to the left in the FIG. 2 configuration and to the right in the FIG. 3 configuration.

In the FIG. 2 configuration, oil flows along conduits 76, 77 and portion 74*b* of conduit 74 to supply chamber 14*b* of device 13. To permit leftward displacement of rod 16, the oil in chamber 14*a* of device 13 is fed back into tank 90 along portion 73*b* of conduit 73, along conduit 78, through distributor 50, and along a conduit 82 and portion 75*b* of conduit 75.

Similarly, as shown in FIG. 3, chamber 14*a* of the actuating device 13 is supplied with oil by pump 18 to produce a rightward displacement of rod 16 by feeding the oil through valve 30 and along conduits 76, 78 and portion 73*b* of conduit 73. As before, the oil in chamber 14*b* of device 13 is fed back into reservoir 90 along portion 74*b* of conduit 74, along conduit 77, through the distributor 50, and along conduit 82 and portion 75*b* of conduit 75.

To switch to the fast mode of operation, the operator simply switches valve 30 from the position shown in FIG. 1 to the position depicted in FIGS. 2 and 3. At this point, the drive conduit 79 shifts the spool of the change valve 40 leftwards in opposition to spring 41, so as to activate pilot conduits 80, 81 to shift the spool of distributor 50 as determined by the operator using hydraulic steering motor 12 as a hydraulic pump.

Consequently, even when operating in the fast mode of operation, as shown in FIGS. 2 and 3, the unbalance of the circuit comprising conduits 80, 81, portion 73*a* of conduit 73 and portion 74*a* of conduit 74, and so shift distributor 50 one way or the other to supply chamber 14*a* as opposed to chamber 14*b* of the actuating device 13, is still achieved using the mechanical pumping effect of hydraulic steering motor 12.

Even in the fast mode of operation, therefore, it is possible to manually select the turning direction, turning angle, and the speed with which the turning angle is achieved. More specifically, the operator is able to vary the turning speed in proportion to the force exerted on the steering wheel. Otherwise an increase in torque on the steering wheel increases the pressure in pilot conduit 80 (or 81) and so increases the displacement of the spool of distributor 50 and hence oil flow to the steering cylinders. In the FIGS. 2 and 3 configuration, the oil in conduit 75 is drained off into the reservoir 90.

The main difference between the conventional mode of operation and the fast mode of operation is that, the oil pressurized by pump 18 is fed directly to actuating device 13 in the fast mode of operation and only flows through the distributor 50.

As already mentioned, the hydraulic steering system 10 further includes a compensating device 60, which is none other than a "load sensing" device having a calibrating spring 61. The compensating device 60 detects the oil pressure at a point P, where the oil pressure is practically equal to that in conduit 76, i.e. upstream of distributor 50, and calculates the difference between this pressure at $P_1$ and the pressure at a point $P_2$ downstream of distributor 50. By maintaining a constant pressure difference over distributor 50, the maximum oil flow through distributor 50 is controlled so that the oil flow is unaffected by any pressure variations in device 13.

Using the compensating device 60, it is therefore possible to maintain constant oil flow to device 13 regardless of the instantaneous pressure conditions of device 13. Also, to protect circuit 21 against any overpressure when a fast turning is effected, a relief valve 92 is provided to limit the pressure in delivery conduit 76 by draining any oil off into the tank 90. The relief valve for conventional steering is conventionally located inside hydraulic steering motor 12.

The valve 30 may be of any type and may be activated in any way, e.g. electrically, hydraulically, pneumatically, etc. The valve 30 may advantageously, though not necessarily, be activated by one or more push-buttons 11 a on steering wheel 11.

Figure 4:
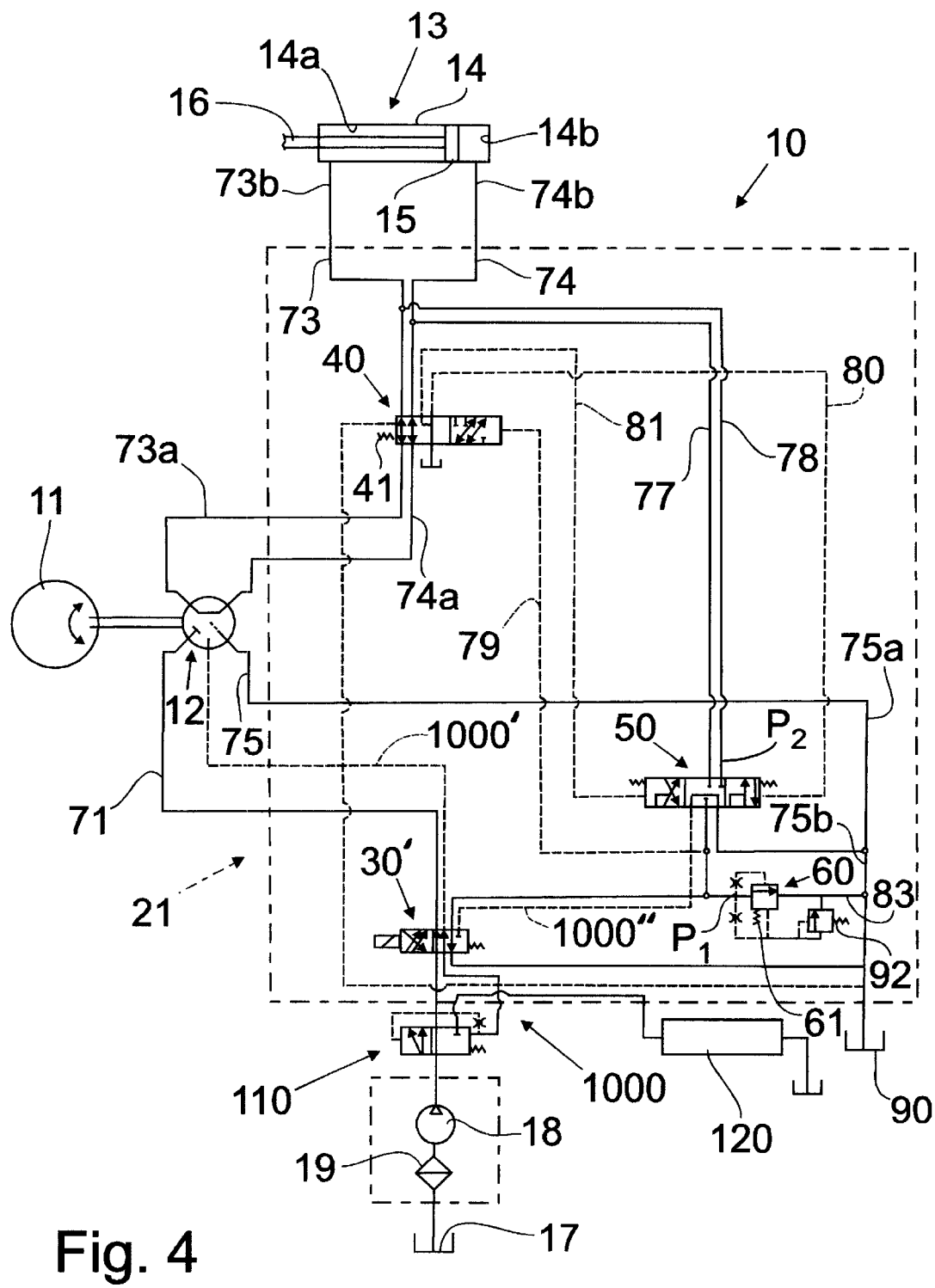
FIG. 4 is a schematic drawing of a hydraulic circuit depicting a second embodiment of a hydraulic steering system incorporating the principles of the instant invention including a closed-center hydraulic steering motor in which steering is performed using a conventional steering wheel, the system being shown in a normal turn configuration.

In a second embodiment shown in FIG. 4, the fast-turn system is extended to a closed-center hydraulic steering motor 12 with a dynamic load sensing line 1000. In this embodiment, valve 30 of the first embodiment is replaced with an electrically activated, seven-way, two-position valve 30' to permit passage of dynamic load sensing line 1000. As will be recalled, valve 30 in FIGS. 1–3 was preferably a four-way, two-position type valve.

To employ normal turn mode, dynamic load sensing line 1000 is switched to the closed-center hydraulic steering motor 12 by solenoid valve 30' (line 1000'). Conversely, to employ fast turn mode, line 1000 is switched to distributor 50 (line 1000"). In this case, the function of the compensator 60 is performed by a priority valve 110, which also permits priority flow to the closed-center hydraulic steering motor 12 with respect to secondary users 120. In the second embodiment shown in FIG. 4, the compensator 60 acts as a second stage of relief valve 92.

Figure 5:
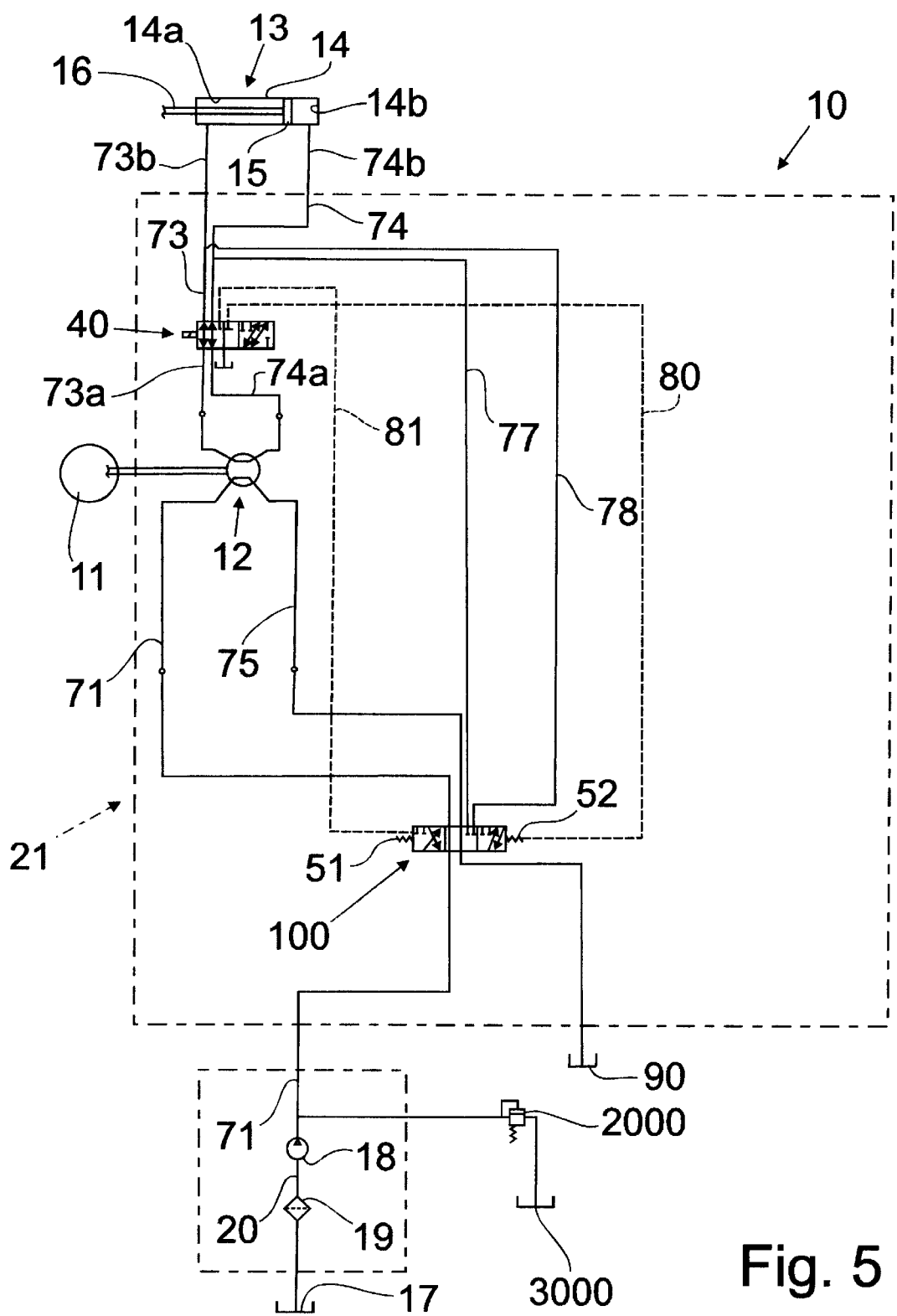
FIG. 5 is a schematic drawing of a hydraulic circuit depicting a third embodiment of the hydraulic steering system incorporating the principles of the present invention.

In a third embodiment shown in FIG. 5, valve 30 is eliminated and between pump 18 and hydraulic steering motor 12, an open-center, six-way, three-position distributor 100 is installed, which, in neutral, provides for "normal turn" mode. The change valve 40, still located between hydraulic steering motor 12 and the actuating device 13, is activated electrically and, when energized, activates open-center distributor 100 by means of pilot conduits 80, 81 as described previously. This third embodiment has the advantage of simplifying the hydraulic circuit by reducing the number of component parts, but fails to provide for effectively controlling the activation speed of device 13, on account of all the oil from pump 18 always flowing through distributor 100, and there being no system of compensation in relation to the load on user device 13. In short, what is achieved in fast turn mode of operation is an extremely fast action on the actuating device 13 but with no possibility of controlling the activation speed.

Also, to protect circuit 21 against any overpressure, a device 2000 is provided to limit the pressure in delivery conduit 71, and which drains any oil off into a tank 3000.

To prevent "fast mode" from being inadvertently implemented by the operator at high vehicle speeds, which would not be desirable, the split valve 30, or the change valve 40 in the case of the second embodiment, may be controlled by an electronic central control unit 11*b*, which prevents it from being activated at travelling speeds over and above a predetermined threshold.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a hydraulic steering system having a first pump mechanically pumping fluid from a tank; and a hydraulic circuit in flow communication with said first pump, said hydraulic circuit including a switching mechanism for selecting pressurized fluid flows for selective supply to a steering actuator, a second pump regulated by a steering input device operated by an operator to select a turning direction, a turning angle, and a speed with which said turning angle is reached; and a fast-turning mechanism selectively activated by the operator for initiating a fast steering mode of operation, the improvement comprising:

said fast turning mechanism being operatively associated with said steering input device such that said steering input device is operable to select the turning direction, the turning angle, and the steering speed with which said turning angle is reached when in said fast steering mode of operation, said steering speed being directly proportional to the intensity of the operator force on the steering input device when operating in said fast steering mode of operation, and said fast steering valve being activated by a selector device and including a fast steering valve located in said hydraulic circuit between said first pump and said second pump.

2. The steering system of claim 1 wherein said second pump is an open-center hydraulic steering control device.

3. The steering system of claim 1 wherein said second pump is a closed-center hydraulic steering control device.

4. The steering system of claim 1 wherein said selector device is positioned on said steering input device.

5. The steering system of claim 1 wherein said fast steering valve is movable to a first position corresponding to a conventional steering mode of operation in which pressurized fluid is directed from said first pump to said second pump and from there onwards to said steering actuator; and to a second position when in said fast steering mode of operation in which pressurized fluid is directed from said first pump directly towards said steering actuator without passing through said second pump.

6. The steering system of claim 5 herein said hydraulic circuit further includes a change valve and a distributor having a positionable spool being regulated by two pilot conduits extending from said change valve.

7. The steering system of claim 6 wherein said change valve has a positionable spool regulated by a pilot conduit in operative communication with said fast steering valve.

8. The steering system of claim 7 wherein said change valve is located in said hydraulic circuit between said second pump and said steering actuator, said distributor being positioned in parallel with said second pump between said fast steering valve and said steering actuator.

9. The steering system of claim 1 further comprising:

a valve located between said second pump and said steering actuator; and a distributor operable to direct pressurized fluid to either said second pump or said steering actuator.

10. The steering system of claim 9 wherein said valve is selectively positionable by the operator in a first position corresponding to a conventional steering mode of operation in which pressurized fluid is directed from said second pump to said steering actuator, said valve also being selectively positionable by the operator in a second position corresponding to said fast steering mode in which a pilot pressure is sent from said second pump through pressure lines connected to said distributor for controlling said distributor to direct pressurized fluid to said steering actuator.

11. The steering system of claim 10 wherein said fast-turning mechanism is controlled by an electronic control unit preventing said fast steering mode of operation from being initiated by the operator at travelling speeds over a predetermined threshold.

12. The steering system of claim 11 wherein said fast turning mechanism is actuated by a selector device positioned on said steering input device.

13. In a hydraulic steering system having a first pump mechanically pumping fluid from a tank; and a hydraulic circuit in flow communication with said first pump, said hydraulic circuit including a switching mechanism for selecting pressurized fluid flows for selective supply to a steering actuator, a second pump regulated by a steering input device operated by an operator to select a turning direction, a turning angle, and a speed with which said turning angle is reached; and a fast-turning mechanism selectively operated by the operator for initiating a fast steering mode of operation, the improvement comprising:

said second pump and said steering input device being operable upon activation of said fast turning mechanism to select the turning direction, the turning angle, and the steering speed with which said turning angle is reached, said steering speed being directly proportional to an intensity of operator force on said steering input device, said hydraulic steering system including a valve located between said second pump and said steering actuator and a distributor operable to direct pressurized fluid to either said second pump or said steering actuator.

14. The hydraulic steering system of claim 13 wherein said valve is selectively positionable by the operator in a first position corresponding to a conventional steering mode of operation in which pressurized fluid is directed from said second pump to said steering actuator, said valve also being selectively positionable by the operator in a second position corresponding to said fast steering mode in which a pilot pressure is sent from said second pump through pressure lines connected to said distributor for controlling said distributor to direct pressurized fluid to said steering actuator.

15. The hydraulic steering system of claim 14 wherein said fast-turning mechanism is controlled by an electronic control unit preventing said fast steering mode of operation from being initiated by the operator at travelling speeds over a predetermined threshold.

16. The hydraulic steering system of claim 15 wherein said fast-turning mechanism includes a fast steering valve which is activated by a selector device is positioned on said steering input device.

* * * * *